US011932031B2

(12) United States Patent
Itoh

(10) Patent No.: US 11,932,031 B2
(45) Date of Patent: Mar. 19, 2024

(54) MOTOR CONTROL APPARATUS AND IMAGE FORMING APPARATUS

(71) Applicant: CANON KABUSHIKI KAISHA, Tokyo (JP)

(72) Inventor: Masatoshi Itoh, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 303 days.

(21) Appl. No.: 16/845,306

(22) Filed: Apr. 10, 2020

(65) Prior Publication Data

US 2020/0338916 A1 Oct. 29, 2020

(30) Foreign Application Priority Data

Apr. 24, 2019 (JP) ................................ 2019-083206

(51) Int. Cl.
*B41J 29/38* (2006.01)
*B41J 13/00* (2006.01)
*G03G 15/00* (2006.01)

(52) U.S. Cl.
CPC ........... *B41J 29/38* (2013.01); *B41J 13/0009* (2013.01); *G03G 15/00* (2013.01)

(58) Field of Classification Search
CPC ........ G03G 15/00; B41J 13/0009; B41J 29/38
See application file for complete search history.

(56) References Cited

U.S. PATENT DOCUMENTS 7,496,300 B2 2/2009 Dan
7,571,907 B2 8/2009 Shinyama
2013/0168921 A1* 7/2013 Suzuki ............... G03G 15/5008 271/225
2013/0320608 A1* 12/2013 Tokoro ............... G03G 15/5004 271/3.2
2015/0063879 A1* 3/2015 Yuasa ................ G03G 15/1615 399/346

FOREIGN PATENT DOCUMENTS

JP H04-190256 A 7/1992
JP H07-170705 A 7/1995
JP H09-084321 A 3/1997
JP 2001-296754 A 10/2001
JP 2003-202719 A 7/2003

(Continued)

OTHER PUBLICATIONS

Machine translation of JP 2003-202719A, obtained Mar. 10, 2023 (Year: 2003).*

(Continued)

*Primary Examiner* — Gregory H Curran
(74) *Attorney, Agent, or Firm* — Venable LLP

(57) ABSTRACT

A motor control apparatus configured to control a motor, includes: a drive circuit of the motor including a semiconductor device and being installed on a different substrate from a substrate of the motor; a load switching unit configured to set a load of the motor in a first state as a first load, and set a load of the motor in a second state as a second load that is smaller than the first load; and a control unit configured to control the drive circuit and the load switching unit, wherein the control unit is configured to control the drive circuit to start rotation of the motor when the load switching unit is in the second state.

4 Claims, 9 Drawing Sheets

(56) References Cited

FOREIGN PATENT DOCUMENTS

| | | | |
|---|---|---|---|
| JP | 2005-266269 | A | 9/2005 |
| JP | 2006-047664 | A | 2/2006 |
| JP | 2006-256814 | A | 9/2006 |
| JP | 2010-190982 | A | 9/2010 |
| JP | 4962515 | B | 6/2012 |
| JP | 2018-203424 | A | 12/2018 |

OTHER PUBLICATIONS

Japanese Office Action issued in corresponding Japanese Application No. 2019-083206 dated Feb. 17, 2023.
Japanese Office Action dated Jul. 28, 2023, in related Japanese Patent Application No. 2019-083206.

* cited by examiner

| | RATED TEMPERATURE | CONVENTIONAL EXAMPLE | EMBODIMENT |
|---|---|---|---|
| COIL | 120°C | 105°C | 120°C |
| SEMICONDUCTOR COMPONENT | 100°C | 100°C | 80°C |

MOTOR CONTROL APPARATUS AND IMAGE FORMING APPARATUS

BACKGROUND OF THE INVENTION

Field of the Invention

The present invention relates to a motor control technique.

Description of the Related Art

Brushless motors are used as the driving source for rotating members of image forming apparatuses. Japanese Patent No. 4962515 discloses a brushless motor including a Hall element configured to detect the rotor position.

In recent years, there is an increase of the output required for brushless motors (hereinafter, simply referred to as motors) along with increasing speed of image forming apparatuses. On the other hand, there is also a need for smaller image forming apparatuses, for which use of smaller motors is required. In other words, there is a need to use smaller motors while securing the output required for increasing the speed of image forming apparatuses.

SUMMARY OF THE INVENTION

According to an aspect of the present invention, a motor control apparatus configured to control a motor, includes: a drive circuit of the motor including a semiconductor device and being installed on a different substrate from a substrate of the motor; a load switching unit configured to set a load of the motor in a first state as a first load, and set a load of the motor in a second state as a second load that is smaller than the first load; and a control unit configured to control the drive circuit and the load switching unit, wherein the control unit is configured to control the drive circuit to start rotation of the motor when the load switching unit is in the second state.

Further features of the present invention will become apparent from the following description of exemplary embodiments with reference to the attached drawings.

DESCRIPTION OF THE EMBODIMENTS

Figure 1:
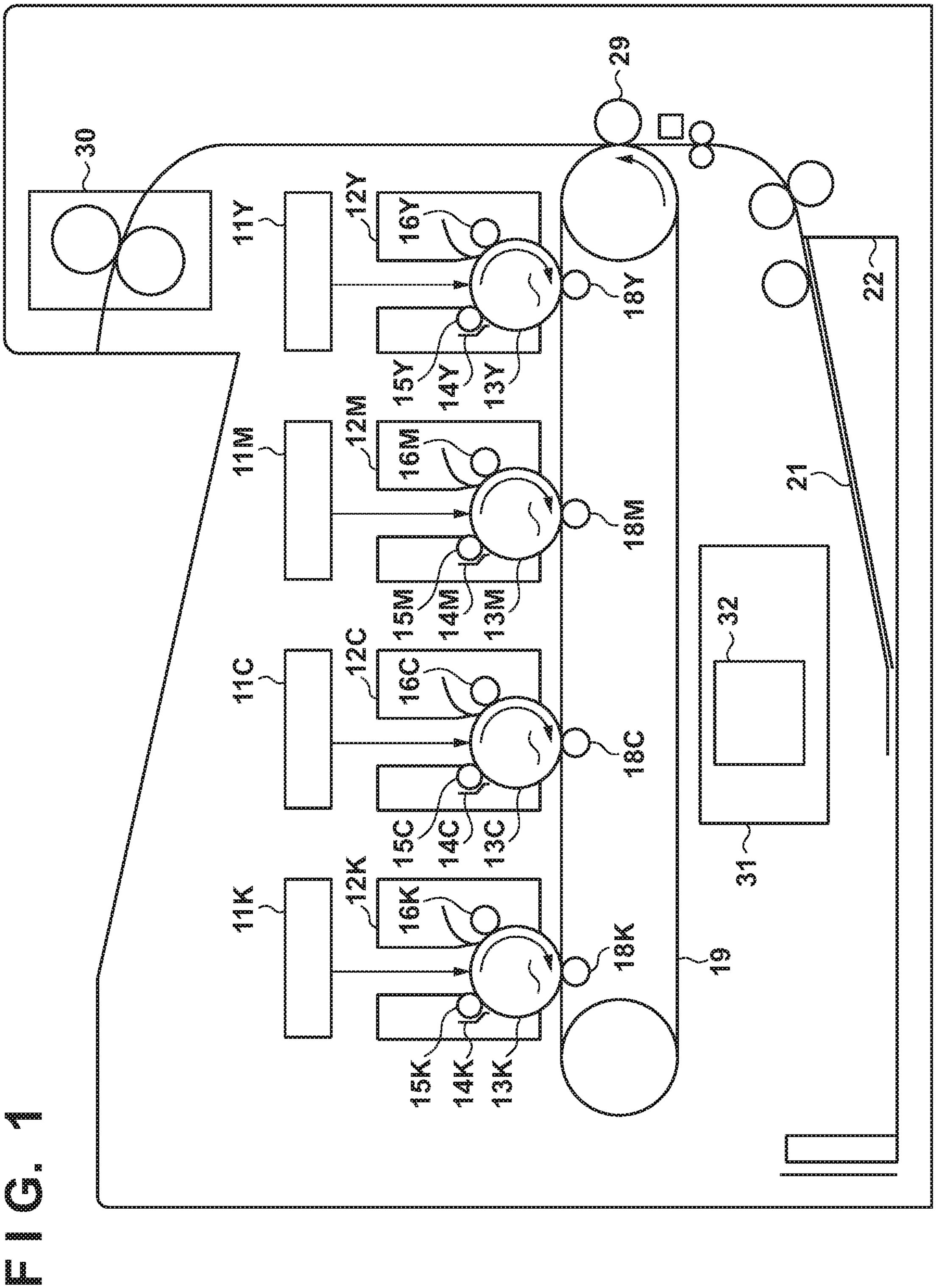
FIG. 1 is a configuration diagram of an image forming apparatus according to one embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a configuration diagram of an image forming apparatus according to the present embodiment. The image forming apparatus forms a full color image by overlapping toner images of four colors: yellow (Y), magenta (M), cyan (C) and black (K). In FIG. 1, Y, M, C, and K at ends of reference numerals indicate that the colors of the toner images involved in the formation of members indicated by the reference numerals are yellow, magenta, cyan, and black. In the following description, when it is not necessary to distinguish the colors from each other, reference numerals excluding Y, M, C, and K at the ends are used. Photoconductors 13 are rotationally driven in the clockwise direction in the drawing when forming an image. Charge rollers 15 charge the surfaces of the corresponding photoconductors 13 to a uniform electric potential. Exposing units 11 exposes the surfaces of the corresponding photoconductors 13 with light to form electrostatic latent images on the photoconductors 13. Developing rollers 16 of developing units 12 develop the electrostatic latent images of the corresponding photoconductors 13 with toner to visualize the latent images as toner images. Primary transfer rollers 18 transfer the toner images formed on the corresponding photoconductors 13 to an intermediate transfer belt 19 by a primary transfer bias. Cleaners 14 remove the toner which has not been transferred to the intermediate transfer belt 19 and remains on the corresponding photoconductors 13. Here, a full-color image is formed on the intermediate transfer belt 19 by transferring toner images formed on each photoconductor 13 to the intermediate transfer belt 19 in an overlapping manner.

The intermediate transfer belt 19 is rotationally driven in the counter-clockwise direction in the drawing when forming an image. Accordingly, the toner image transferred to the intermediate transfer belt 19 is conveyed to a position opposite to a secondary transfer roller 29. On the other hand, a sheet 21 stored in a cassette 22 is fed to a conveyance path from the cassette 22 by rotation of each roller provided along the conveyance path, and conveyed to the position opposite to the secondary transfer roller 29. The secondary transfer roller 29 transfers the toner image on the intermediate transfer belt 19 to the sheet 21 using a secondary transfer bias. Subsequently, the sheet 21 is conveyed to a fixing unit 30. The fixing unit 30 heats and pressurizes the sheet 21 to fix the toner image on the sheet 21. After having the toner image fixed thereon, the sheet 21 is discharged to the outside of the image forming apparatus. A control unit 31 that controls the entire image forming apparatus includes a CPU 32.

Figure 2:
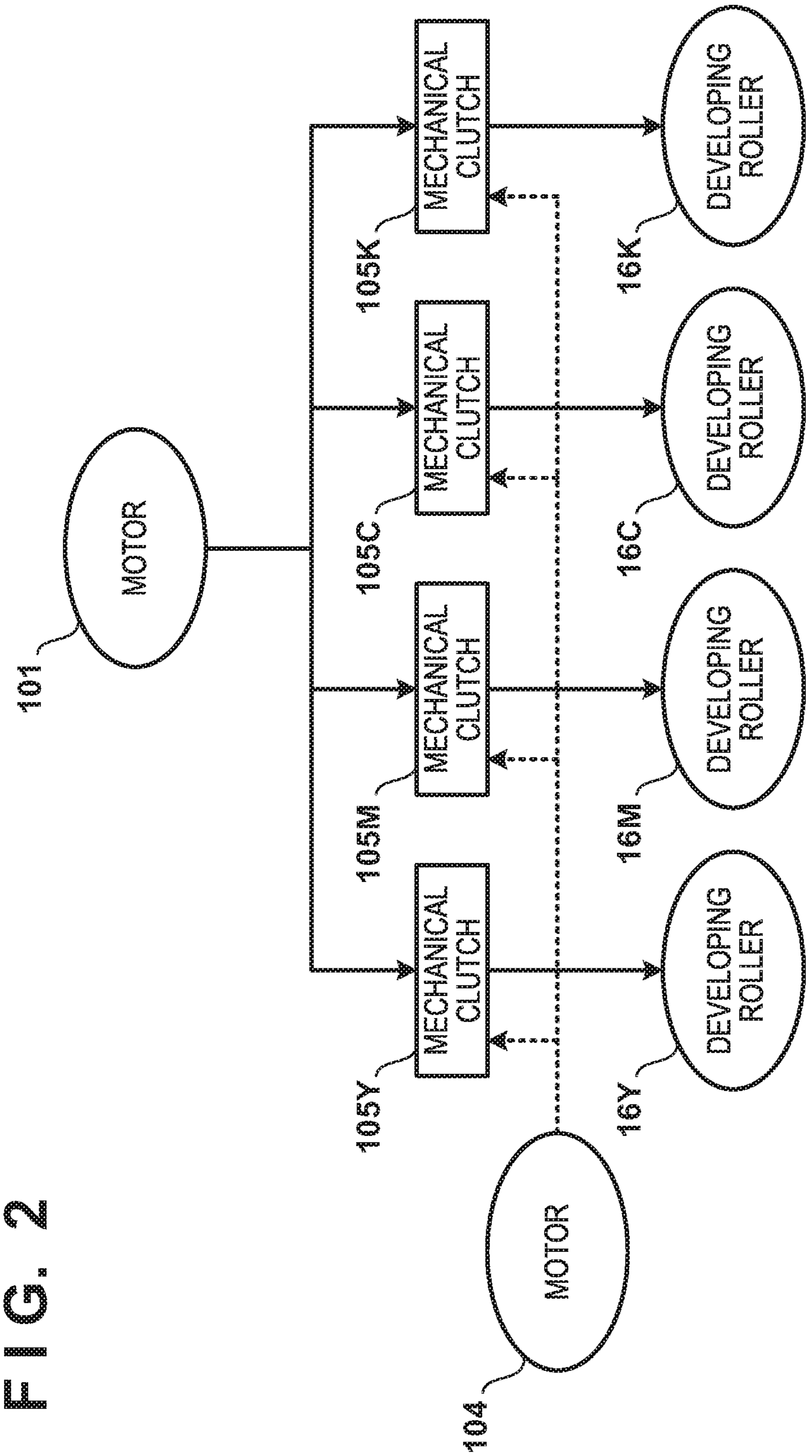
FIG. 2 is a drive configuration diagram of a developing roller according to one embodiment.

FIG. 2 illustrates a drive configuration of the developing rollers 16 according to the present embodiment. The developing rollers 16 respectively include corresponding mechanical clutches 105 provided thereon. A motor 101, being a brushless motor, is a drive source of the developing rollers 16. A motor 104, which is a motor such as a stepping motor that can control the rotation position, controls the mechanical clutches 105. The motor 101 and the motor 104 are controlled by the control unit 31. The mechanical clutches 105 take one of two states: a state in which the driving force of the motor 101 is transmitted to the corresponding developing rollers 16 (hereinafter, transmission state), and a state in which transmission of the driving force of the motor 101 to the developing rollers 16 is disconnected (hereinafter, disconnected state). The motor 104 switches the state of the mechanical clutches 105 by transmitting the rotational force to the mechanical clutches 105. Here, amount of rotation is configured such that amounts of rotation of the motor 104 for placing the mechanical clutches 105Y, 105M, 105C and 105K in the disconnected state to be in the transmission state differ each other. The present embodiment assumes that transition of the mechanical clutches to the transmission state occurs in the order of 105Y, 105M, 105C and 105K. Here, in the present embodiment, although the mechanical clutches 105 switch the transmission and disconnection of the driving force of the motor 101 to the load (developing rollers 16), there may also be a configuration that uses an electromagnetic clutch or the like. As thus described, the mechanical clutches 105 function as a load switching unit that makes the load of the motor 101 in the disconnected state smaller than the load in the transmission state.

Figure 3:
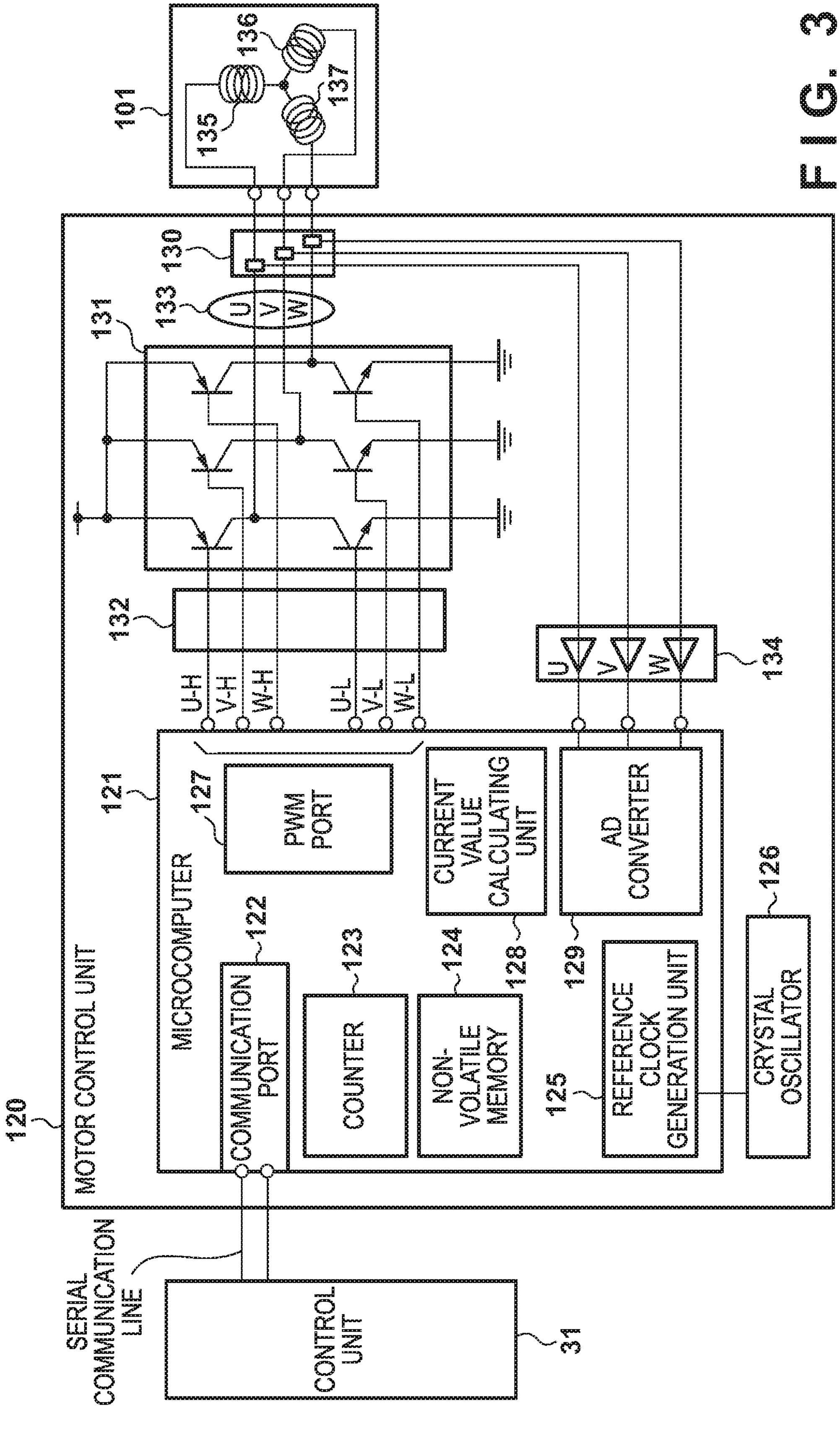
FIG. 3 is a control configuration diagram of a motor according to one embodiment.

FIG. 3 is a control configuration diagram of the motor 101. A motor control unit 120 includes a microcomputer 121. A communication port 122 of the microcomputer 121 performs serial communication with the control unit 31. The control unit 31 controls rotation of the motor 101 by controlling the motor control unit 120 by serial communication. A reference clock generation unit 125 generates a reference clock based on output of a crystal oscillator 126. A counter 123 performs measurement or the like of the pulse period based on the reference clock. A non-volatile memory 124 stores various data or the like used for controlling the motor. The microcomputer 121 outputs a pulse width modulation signal (PWM signal) from a PWM port 127. In the present embodiment, the microcomputer 121 outputs, for each of three phases (U, V and W) of the motor 101, a total of six PWM signals, namely, high-side PWM signals (U-H, V-H and W-H), and low-side PWM signals (U-L, V-L and W-L). Therefore, the PWM port 127 includes six terminals: U-H, V-H, W-H, U-L, V-L and W-L.

Each terminal of the PWM port 127 is connected to a gate driver 132, and the gate driver 132 performs ON and OFF control of each switching element of a three-phase inverter 131 based on the PWM signals. Here, the inverter 131 includes a total of six switching elements, namely, three on the high-side and three on the low-side for each phase, and the gate driver 132 controls each switching element based on the corresponding PWM signals. A transistor or an FET, for example, may be used as a switching element. The present embodiment assumes that the corresponding switching element is turned ON when the PWM signal is high, or the corresponding switching element is turned OFF when the PWM signal is low. Outputs 133 of the inverter 131 are connected to coils 135 (U-phase), 136 (V-phase) and 137 (W-phase) of the motor 101. Controlling ON and OFF of each switching element of the inverter 131 allows for controlling excitation current (coil current) of respective coils 135, 136 and 137. As thus described, the microcomputer 121, the gate driver 132, and the inverter 131 function as a voltage control unit that controls the voltage applied to the plurality of coils 135, 136 and 137.

A current sensor 130 outputs detection voltages according to the value of coil current flowing through each of the coils 135, 136 and 137. An amplification unit 134 amplifies and also applies an offset voltage to the detection voltage of each phase, and outputs the resulting voltages to an analog-to-digital converter (AD converter) 129. The AD converter 129 converts the amplified detection voltages into digital values. A current value calculating unit 128 determines a coil current of each phase based on the output values (digital values) of the AD converter 129. For example, the current sensor 130 outputs a voltage of 0.01 V per ampere, increases the amplification ratio (gain) at the amplification unit 134 by 10-fold, and sets an offset voltage of 1.6 V to be applied by the amplification unit 134. Assuming a range of the coil current flowing in the motor 101 to be from −10 A to +10 A, the range of voltage output by the amplification unit 134 lies from 0.6 V to 2.6 V. For example, assuming that the AD converter 129 converts and outputs a voltage from 0 to 3 V into a digital value from 0 to 4095, an excitation current of from −10 A to +10 A is converted into a digital value of approximately from 819 to 3549. Here, the current value is defined to be positive when the excitation current is flowing from the inverter 131 toward the motor 101, and negative in the reverse direction.

The current value calculating unit 128 acquires the excitation current by subtracting an offset value corresponding to the offset voltage from the digital value, and multiplying the resulting value with a predetermined conversion coefficient. In the present example, the offset value corresponding to the offset voltage (1.6 V) is about 2184 (1.6×4095/3). In addition, the conversion coefficient is about 0.000733 (3/4095). As thus described, the current sensor 130, the amplification unit 134, the AD converter 129, and the current value calculating unit 128 form a current detection unit.

Figures 4, 5:
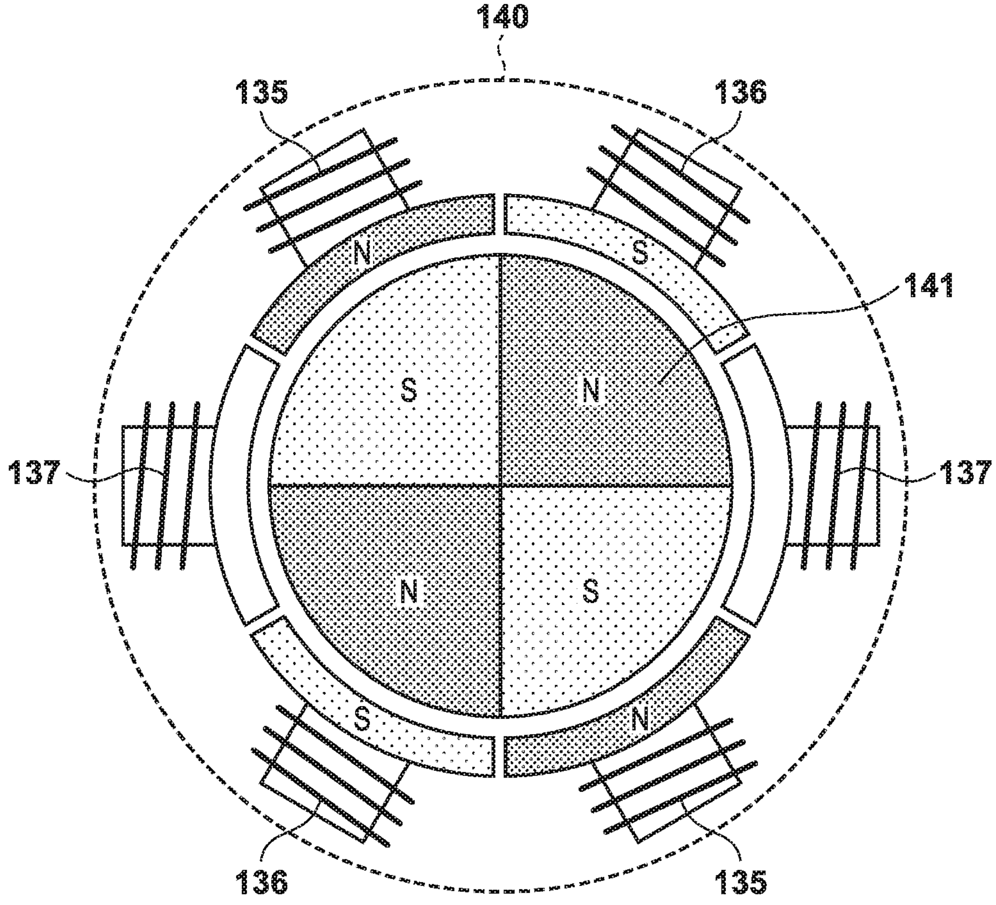
FIG. 4 is a configuration diagram of a motor according to one embodiment.
FIG. 5 is an explanatory view of the effect according to one embodiment.

FIG. 4 is a configuration diagram of the motor 101. The motor 101 includes a 6-slot stator 140 and a four-pole rotor 141, the stator 140 including the U-phase, V-phase and W-phase respective coils 135, 136 and 137. The rotor 141, being formed of a permanent magnet, has two pairs of N/S poles. A conventional brushless motor has installed therein semiconductor devices (semiconductor components) such as, a three-phase inverter 131 including switching elements, a gate driver 132, and a Hall element configured to detect the position of the rotor 141. In the present embodiment, the motor 101 does not have such semiconductor devices installed therein. Specifically, the drive circuits of the motor 101 including semiconductor devices such as a three-phase inverter 131 and a gate driver 132 are installed on a substrate (not illustrated) provided at a different position from the substrate on which the motor 101 is installed. For example, such drive circuits can be installed on the same substrate as that of the microcomputer 121 or the like, as illustrated in FIG. 3. Here, also the control unit 31 is installed on a different substrate from the substrate of the motor 101. In addition, the present embodiment does not use a Hall element to detect the position of the rotor 141. In other words, the motor 101 is a sensorless motor. Instead of using a Hall element, the position of the rotor 141 is detected based on the rising speed of the coil current of the coils 135 to 137 detected by the current detection unit, while the rotor 141 is not operating, or when the rotation speed is low. The inductance of the coil varies due to the magnetic field of the facing rotor 141, and therefore the position of the rotor 141 can be detected based on the rising speed of the coil current.

In addition, when the rotation speed of the rotor 141 is high, the position of the rotor 141 is detected based on an induced voltage generated in the coils 135 to 137. As thus described, the motor 101 of the present embodiment does not have semiconductor devices installed therein, and the motor 101 is formed of only mechanical parts including the rotor 141, the stator 140, and the coils 135, 136 and 137.

As illustrated in FIG. 5, the rated temperature of the coil is determined according to the insulation class of the coil film, and the rated temperature is 120 degrees for a general type E. In addition, the rated temperature of semiconductor devices (semiconductor components) such as switching elements, Hall elements, gate drivers, or the like is generally about 100 degrees. Therefore, in a case where semiconductor devices are installed in the motor 101 as conventionally, the motor 101 must be activated in a manner not exceeding the rated temperature of the semiconductor. For example, the "conventional example" of FIG. 5 indicates that, activating the motor 101 in a manner not exceeding the rated temperature of the semiconductor has reduced the current flowing through the coil, whereby the coil temperature has become about 105 degrees. As thus described, the motor 101 having semiconductor devices installed therein requires the current flowing through the coil to be smaller than the current allowed at the rated temperature, which also results in a reduced output of the motor. In the present embodiment, semiconductor devices are not installed in the motor 101, which mitigates the effect of heat to the semiconductor devices, and therefore it is possible to increase the current flowing in the coil up to an acceptable current at the rated temperature. In other words, it is possible to increase the temperature of the coil up to 120 degrees, which is the rated temperature, as illustrated in the "embodiment" of FIG. 5. Therefore, it is not necessary to reduce the output of the motor due to the rated temperature of the semiconductor devices, and the output of the motor can be utilized to a maximum degree. Therefore, it is possible to secure a required output, even with a downsized motor.

Figure 6:
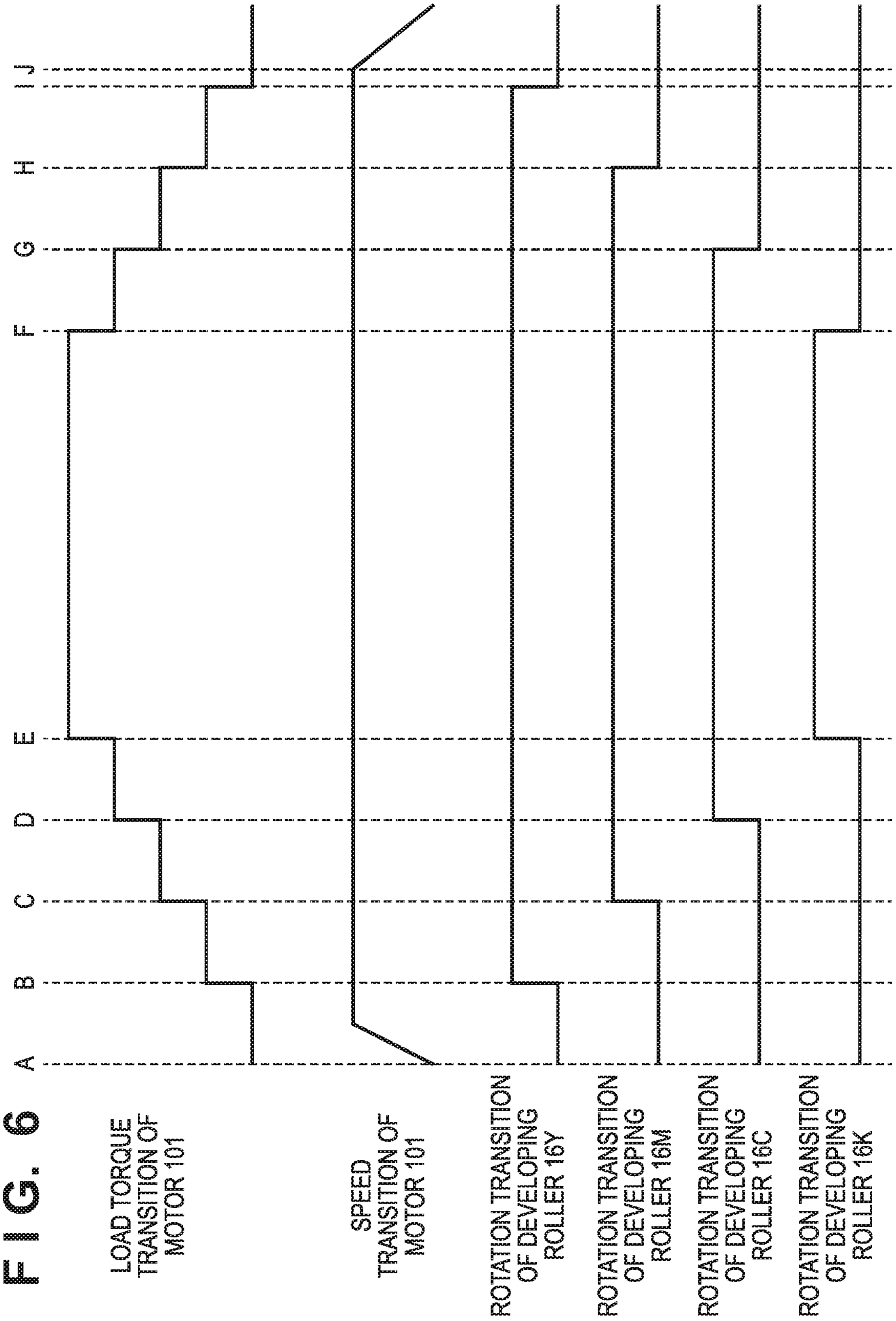
FIG. 6 is an explanatory view of a drive control of a developing roller according to one embodiment.

FIG. 6 is an explanatory view of the drive control of the developing rollers 16. At a timing A, the control unit 31 activates the motor 101. Here, the control unit 31 has set all the mechanical clutches 105 in the disconnected state at the timing A. Therefore, all the developing rollers 16 being loads are isolated from the motor 101 at the timing A. During the timings A and B, the rotation speed of the motor 101 increases up to a predetermined target speed. Subsequently, the control unit 31 performs the drive control of the motor 104, and the mechanical clutch 105Y first transitions to the transmission state at a timing B. Accordingly, the developing roller 16Y starts rotating. Subsequently, at timings C, D and E, the mechanical clutches 105M, 105C and 105K respectively transition to the transmission state. Accordingly, the developing rollers 16M, 16C and 16K start rotating at timings C, D, and E. As illustrated in FIG. 6, the load torque of the motor 101 increases at timings B, C, D and E, respectively. Upon completion of image formation, the control unit 31 rotates the motor 104. Accordingly, the mechanical clutches 105Y, 105M, 105C and 105K transition to the disconnected state at timings F, G, H and I, respectively. Therefore, the developing rollers 16Y, 16M, 16C and 16K terminate at the timings F, G, H and I, respectively. Subsequently, at a timing J, the control unit 31 terminates rotation of the motor 101.

As thus described, there is provided a mechanism for isolating the load from the motor 101, and the motor 101 is activated in a state with the load being isolated from the motor 101. Isolating the load at the time of activation allows for shortening the activation time of the motor 101. In addition, isolating the load at the time of activation allows for securing required output even when a small motor is used as the motor 101.

Figure 7:
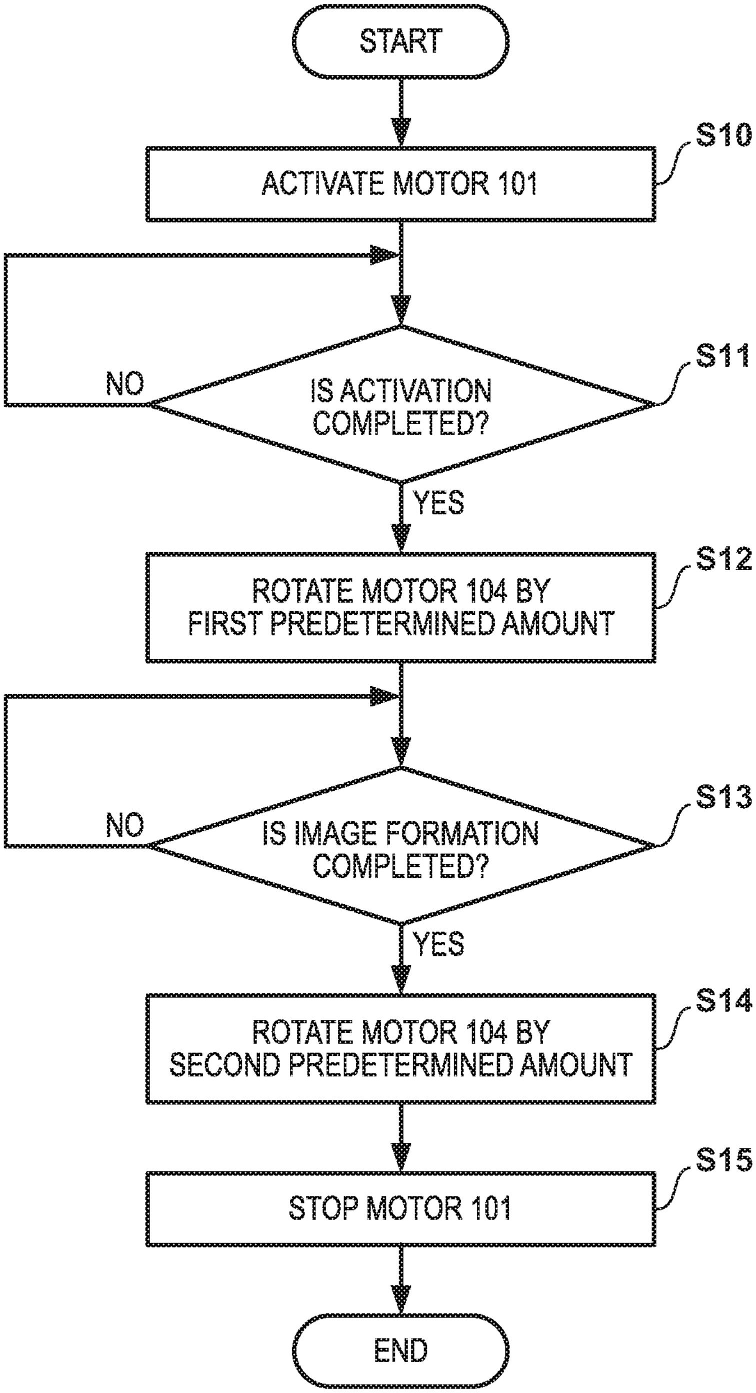
FIG. 7 is a flowchart of a motor control process according to one embodiment.

FIG. 7 is a flowchart of a control process of the motor 101 executed by the control unit 31 in the present embodiment. Upon starting image formation, the control unit 31 starts activation of the motor 101 at S10. Here, the control unit 31 preliminarily sets the mechanical clutches 105 in the disconnected state before starting image formation. The control unit 31 waits, at S11, until activation of the motor 101 is completed, that is, for example until the rotation speed of the motor 101 reaches a predetermined speed. Upon completion of activation of the motor 101, the control unit 31 rotates the motor 104 by a first predetermined amount at S12. Accordingly, the mechanical clutches 105Y, 105M, 105C and 105K transition to the transmission state in sequence. The control unit 31 waits until image formation is completed at S13. Upon completion of the image formation, the control unit 31 rotates the motor 104 by a second predetermined amount at S14. Accordingly, the mechanical clutches 105Y, 105M, 105C and 105K to transition to the disconnected state in sequence. Subsequently, at S15, the control unit 31 terminates the motor 101.

Figure 8:
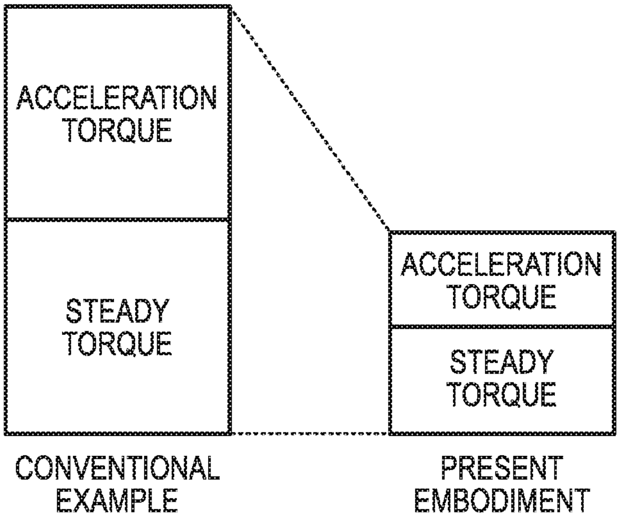
FIG. 8 is an explanatory view of the effect of one embodiment.

FIG. 8, which is an explanatory view of the effect of the present embodiment, illustrates a load torque at the time of activating the motor 101. Here, the load torque at the time of activation is the sum of steady torque and acceleration torque. In the known example without the mechanical clutches 105, the load torque at the time of activation increases. It is therefore necessary to use a motor that can output such a large load torque as the motor 101. In the present embodiment, the load torque is reduced by the mechanical clutches 105 at the time of activation, and therefore a small-sized motor with a smaller output can be used as the motor 101. In addition, the activation time can be shortened. Furthermore, in the present embodiment as described above, the motor 101 and the drive circuit turn out to be installed on separate substrates, with the drive circuit including semiconductor devices not being installed in the motor 101. Therefore, it is not necessary to reduce the coil current to keep the drive circuit including semiconductor devices within the rated temperature. Therefore, a smaller-sized motor can be used while securing required output in comparison with using a motor having semiconductor devices installed therein.

Here, in the present embodiment, there are respectively provided the mechanical clutches 105 corresponding to the developing rollers 16, so that all the developing rollers 16 are isolated from the motor 101 before starting image formation. However, there may be a configuration in which a mechanical clutch is provided corresponding to at least one of the developing rollers 16Y, 16M, 16C and 16K, with at least one of the developing rollers 16 being isolated from the motor 101. Furthermore, in the present embodiment, there are different timings of causing transition of the mechanical clutches 105Y, 105M, 105C and 105K to the transmission state, respectively. However, there may be a configuration in which the timings of causing transition of the mechanical clutches 105Y, 105M, 105C and 105K to the transmission state are the same. Furthermore, there may also be a configuration in which same timings are set to cause two or three of the four mechanical clutches 105 to transition to the transmission state. The same goes for transition to the disconnected state.

Second Embodiment

Subsequently, a second embodiment will be described mainly focusing on the difference from the first embodiment.

Figure 9:
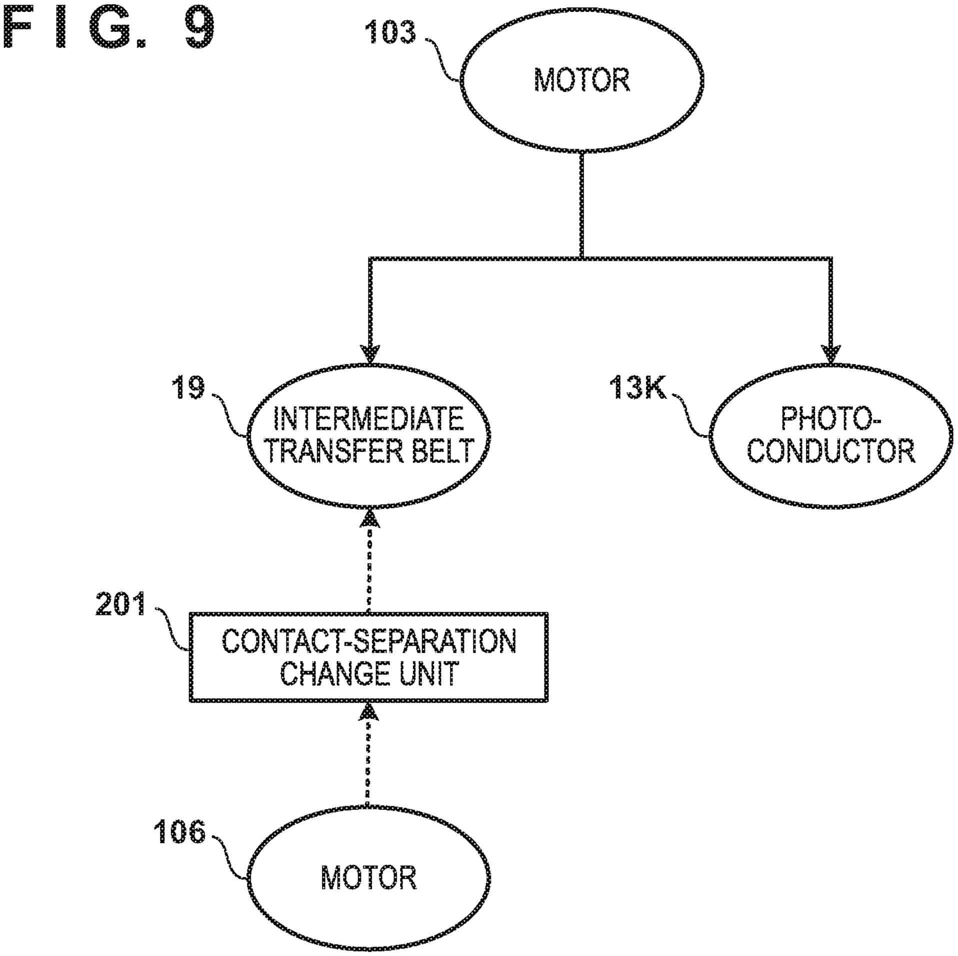
FIG. 9 is a drive configuration diagram of an intermediate transfer belt and a photoconductor according to one embodiment.

Here, the configuration of the image forming apparatus is identical to that illustrated in FIG. 1. In the present embodiment, there will be described a control of the motor that drives the intermediate transfer belt 19 and a photoconductor 13K. FIG. 9 illustrates a drive configuration of the intermediate transfer belt 19 and the photoconductor 13K. A motor 103, being a brushless motor, is a drive source the intermediate transfer belt 19 and the photoconductor 13K. The control configuration and the structure of the motor 103 are similar to the first embodiment. In other words, the motor 103 is a sensorless motor without including semiconductor devices. A motor 106, which is a motor such as a stepping motor that can control the rotation position, controls a contact-separation change unit 201. The contact-separation change unit 201 performs switching between a contact state in which the intermediate transfer belt 19 contacts all the primary transfer rollers 18 and all the photoconductors 13, and a separated state in which the intermediate transfer belt 19 separates from all the primary transfer rollers 18 and all the photoconductors 13. Here, in the separated state, there may be a configuration in which only all the primary transfer rollers 18 separate from the intermediate transfer belt 19, or a configuration in which only all the photoconductors 13 separate from the intermediate transfer belt 19. Furthermore, in the separated state, there may be a configuration in which at least one of the primary transfer rollers 18Y, 18M, 18C and 18K, and the photoconductors 13Y, 13M, 13C and 13K separate from the intermediate transfer belt 19. The number of members contacting the intermediate transfer belt 19 in the separated state is smaller than that in the contact state, and therefore the load of the motor 103 in the separated state is smaller than the contact state. As thus described, the contact-separation change unit 201 functions as a load switching unit that makes the load of the motor 103 in the separated state smaller than the load in the contact state.

Figure 10:
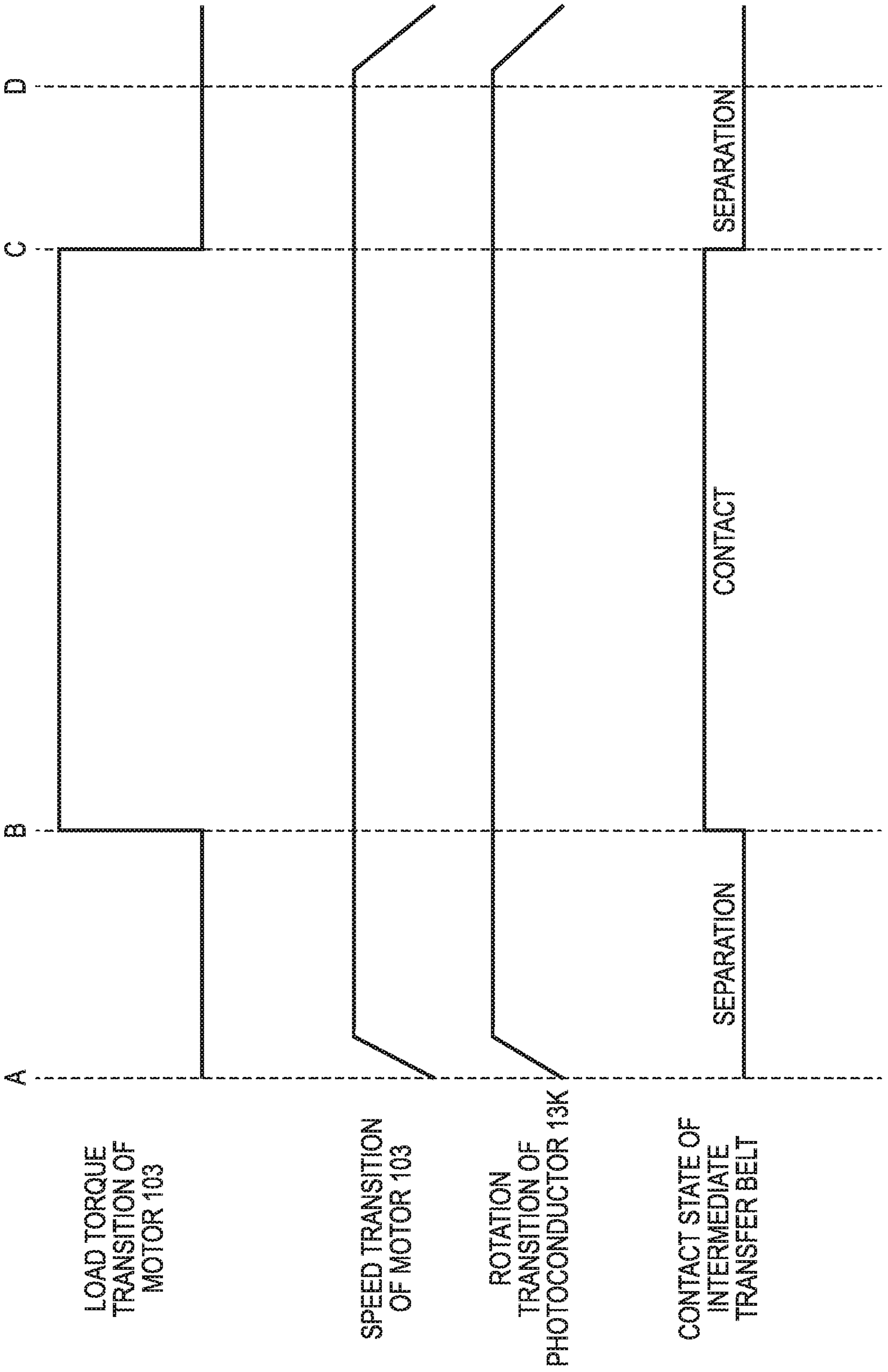
FIG. 10 is an explanatory view of the drive control of the intermediate transfer belt and the photoconductor according to one embodiment.

FIG. 10 is an explanatory view of the drive control of the intermediate transfer belt and the photoconductor. The control unit 31 activates the motor 103 at the timing A. Here, the intermediate transfer belt is in the separated state at the timing A. Therefore, at the timing A, the load for rotating the intermediate transfer belt 19 is smaller than the load in the contact state. During the timings A and B, the rotation speed of the motor 103 increases up to a predetermined target speed. In addition, the rotation speed of the photoconductor 13K also increases in accordance therewith. Here, although not illustrated in FIG. 10, the rotation speed of the intermediate transfer belt 19 also increases similarly to the photoconductor 13K. Subsequently, the control unit 31 drives the motor 106, whereby the intermediate transfer belt 19 transitions to the contact state at the timing B. Therefore, at the timing B, the load torque of the motor 103 increases. Upon completion of image formation, the control unit 31 rotates the motor 106, and causes the intermediate transfer belt 19 to transition to the separated state at a timing C. Accordingly, the load torque of the motor 103 decreases. Subsequently, at a timing D, the rotation of the motor 103 terminates.

Figure 11:
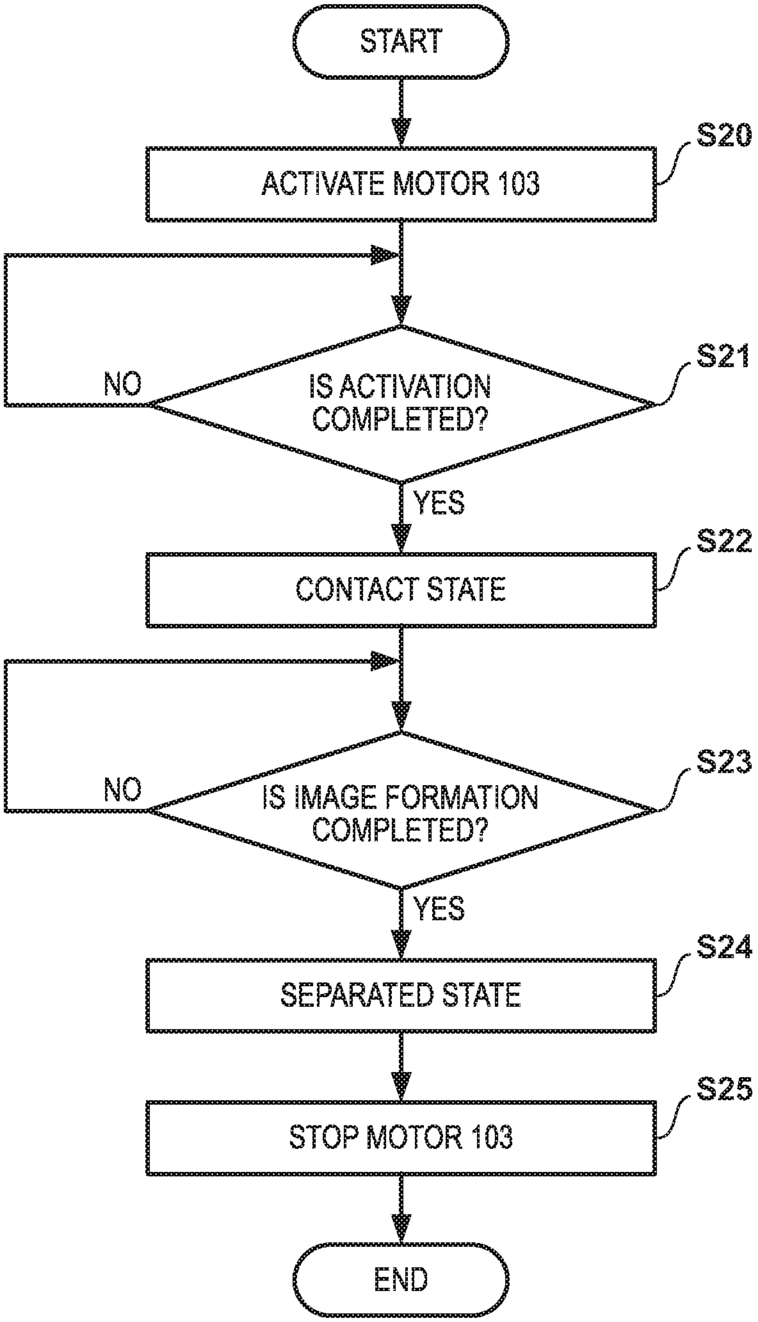
FIG. 11 is a flowchart of a motor control process according to one embodiment.

FIG. 11 is a flowchart of the control process of the motor 103 executed by the control unit 31 in the present embodiment. Upon starting image formation, the control unit 31 starts activation of the motor 103 at S20. The control unit 31 waits at S21 until activation of the motor 103 is completed, that is, for example, until the rotation speed of the motor 103 reaches a predetermined speed. Upon completion of activation of the motor 103, the control unit 31 controls the contact-separation change unit 201 at S22 to cause the intermediate transfer belt 19 to transition to the contact state. The control unit 31 waits at S23 until image formation is completed. Upon completion of image formation, the control unit 31 controls the contact-separation change unit 201 to cause the intermediate transfer belt 19 to transition to the separated state at S24. Subsequently, at S25, the control unit 31 terminates the motor 103. Here, in the present embodiment, the contact-separation change unit 201 is mechanically controlled by the motor 106 to cause transition of the state of the intermediate transfer belt 19. However, there may also be a configuration in which a mechanical force is generated by an electromagnetic control using an electromagnetic solenoid or the like to cause transition of the state of the intermediate transfer belt 19.

Here, the motor control unit 120 and a part relating to motor control of the control unit 31 can be installed as a motor control apparatus. Furthermore, although embodiments have been described taking a particular rotating member of the image forming unit of the image forming apparatus as an example, the present invention is not limited to rotation control of the rotating member described in the embodiments. For example, the configuration described in the first embodiment can be used for rotation control of the photoconductors 13, rotation control of the developing rollers 16, and rotation control of the intermediate transfer belt 19, for example. Similarly, the configuration described in the second embodiment can be applied to rotation control of the photoconductors 13 and the developing rollers 16, for example. Furthermore, the configuration described in the first embodiment can be used for rotation control of the roller for conveying the sheet 21. Furthermore, the present invention can be applied to rotation control of an arbitrary member other than the image forming apparatus driven by the driving force of the motor.

Here, in each of the embodiments described above, the motors 101 and 103 and the drive circuit are installed on separate substrates, however, they may be installed on a same substrate provided that they are installed apart from each other by a predetermined distance so that heat of the drive circuit does not affect the motors 101 and 103. For example, there may be a configuration in which the motor 101 and the drive circuit are placed in the image forming apparatus so as not to contact each other, provided that by separating the motor 101 and the drive circuit not contacting each other, heat of the drive circuit is prevented from affecting the motor 101. The same goes for the control unit 31. In addition, although the three-phase inverter 131 and the gate driver 132 form the drive circuit of the motors 101 and 103 in the aforementioned embodiments, the motor control unit 120 may also form the drive circuit.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-083206, filed Apr. 24, 2019, which is hereby incorporated by reference herein in its entirety.

What is claimed is:

1. An image forming apparatus comprising:

an image forming unit including a plurality of developing rollers that develop electrostatic images formed on a plurality of photoconductors, and configured to form an image developed by the plurality of developing rollers on a sheet;

a brushless motor of a sensorless type including a rotor formed of a permanent magnet and a stator provided with a plurality of coils corresponding to phases of the rotor, the brushless motor being a driving source of the plurality of developing rollers;

a drive circuit including a semiconductor device having a switching element and a gate driver, and configured to apply voltages to the plurality of coils for driving the motor, and to detect current values flowing through the plurality of coils to specify a rotational position of the rotor;

a plurality of clutches provided in drive transmission paths from the brushless motor to the plurality of developing rollers, and configured to switch transmitting and disconnecting a driving force from the brushless motor to each of the plurality of developing rollers; and a control unit configured to control the drive circuit and the plurality of clutches, wherein the drive circuit is installed on a different substrate than a substrate of the brushless motor, and the control unit is configured to control the drive circuit to start rotation of the brushless motor in a state where the driving force from the brushless motor to the plurality of developing rollers is disconnected by the plurality of clutches, and is configured to control the plurality of clutches in order to transmit the driving force from the brushless motor to each of the plurality of developing rollers, in order, after a rotation speed of the brushless motor has reached a predetermined speed.

2. The image forming apparatus according to claim 1, wherein the control unit is configured to control the plurality of clutches to transmit the driving force from the brushless motor to each of the plurality of developing rollers before the image forming unit starts forming an image after rotation of the brushless motor has started.

3. The image forming apparatus according to claim 1, wherein the control unit is configured to control the drive circuit to stop rotation of the brushless motor in the state where the driving force from the brushless motor to each of the plurality of developing rollers is disconnected by the plurality of clutches after the image forming unit has completed the image forming.

4. The image forming apparatus according to claim 1, wherein the brushless motor does not include semiconductor devices.

* * * * *